ns512413443B2

United States Patent
Paleti et al.

(10) Patent No.: US 12,413,443 B2
(45) Date of Patent: Sep. 9, 2025

(54) USB TYPE-C/PD PORT REAL TIME MONITORING AND CONTROL IN AN AUTOMOTIVE OR INDUSTRIAL ECOSYSTEM

(71) Applicant: Cypress Semiconductor Corporation, San Jose, CA (US)

(72) Inventors: Bhargav Teja Paleti, Eluru (IN); Debraj Bhattacharjee, Bengaluru (IN); Kailas Iyer, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 396 days.

(21) Appl. No.: 17/331,866

(22) Filed: May 27, 2021

(65) Prior Publication Data
US 2022/0070018 A1    Mar. 3, 2022

Related U.S. Application Data

(60) Provisional application No. 63/073,876, filed on Sep. 2, 2020.

(51) Int. Cl.
*H04L 12/40* (2006.01)
*G06F 1/3215* (2019.01)

(52) U.S. Cl.
CPC ............ *H04L 12/40* (2013.01); *G06F 1/3215* (2013.01); *H04L 2012/40215* (2013.01); *H04L 2012/40234* (2013.01); *H04L 2012/40273* (2013.01)

(58) Field of Classification Search
USPC ........................................................ 370/257
See application file for complete search history.

(56) References Cited

U.S. PATENT DOCUMENTS

| | | | | |
|---|---|---|---|---|
| 6,145,045 A * | 11/2000 | Falik | .................. | G06F 13/4295 710/310 |
| 6,757,776 B1 * | 6/2004 | Pew | ...................... | G06F 13/385 370/252 |
| 10,362,035 B1 * | 7/2019 | Corbett | .................. | H04L 63/102 |
| 11,139,992 B1 * | 10/2021 | Biggers | .................. | H04L 49/25 |
| 2003/0163587 A1 * | 8/2003 | Knight | ................ | H04L 12/4604 709/249 |
| 2007/0079045 A1 * | 4/2007 | Luke | ..................... | G06F 13/376 710/313 |

(Continued)

*Primary Examiner* — Ayman A Abaza
*Assistant Examiner* — Hooman Houshmand

(57) ABSTRACT

Disclosed are solutions for communicating with USB-C/PD systems over standard communication interfaces in automotive, aviation, industrial, or other applications. In one aspect, the solutions facilitate a controller of the automotive Local Interconnect Network (LIN) bus such as a vehicle electronic control unit (ECU) to configure, control, and monitor charging and fault data of ports of a USB-C/PD system over the existing vehicle network. The USB-C/PD system may decode a message frame to determine a frame type. If the message frame is a request frame, control data is received from the ECU over the LIN bus to control the operations of the USB-C/PD port. If the message frame is a response frame, the USB-C/PD port transmits response data that monitors the operations of the USB-C/PD port to the ECU over the LIN bus. Advantageously, the USB-C/PD system may be easily integrated into existing communication networks, providing a cost-effective and scalable solution.

20 Claims, 15 Drawing Sheets

(56) References Cited

U.S. PATENT DOCUMENTS

| | | | |
|---|---|---|---|
| 2008/0112420 A1* | 5/2008 | Wang | H04L 47/2433 370/401 |
| 2008/0147321 A1* | 6/2008 | Howard | G01C 21/3673 455/3.06 |
| 2019/0268444 A1* | 8/2019 | Mardmoeller | H04L 69/18 |
| 2019/0278731 A1* | 9/2019 | Mattos | G06F 1/26 |
| 2021/0055777 A1* | 2/2021 | Regupathy | G06F 13/4295 |

* cited by examiner

| Identifier | Type | Length (bytes) | Data |
|---|---|---|---|
| 0x00 | PUBLISH | 2 | Response Error bit and Fault sticky bits are located in this Message |
| 0x3C | SUBSCRIBE | 8 | Master Request Frame (MRF) |
| 0x3D | PUBLISH | 8 | Slave Response Frame (SRF) |

309

| Service ID | Description |
|---|---|
| 0xB1 | Assign a Frame ID |
| 0xB2 | Read by Identifier |
| 0xB7 | Assign Frame ID Range |
| 0xB8 | Configuration update |
| 0x23 | UDS Read memory by Address |
| 0x3D | UDS Write memory by Address |

FIG. 5

| Type | PCI type | | | | Additional information | | | |
|---|---|---|---|---|---|---|---|---|
| | B7 | B6 | B5 | B4 | B3 | B2 | B1 | B0 |
| SF | 0 | 0 | 0 | 0 | Length | | | |
| FF | 0 | 0 | 0 | 1 | Length/256 | | | |
| CF | 0 | 0 | 1 | 0 | Frame counter | | | |

FIG. 6

| NAD | PCI | SID | D1 | D2 | D3 | D4 | D5 |

Single Request Frame

| NAD | PCI | LEN | SID | D1 | D2 | D3 | D4 |

First Request Frame of Multiple PDUs

| NAD | PCI | D1 | D2 | D3 | D4 | D5 | D6 |

Consecutive Request Frame of Multiple PDUs

FIG. 7

| NAD | PCI | RSID | D1 | D2 | D3 | D4 | D5 |

Single Response Frame

| NAD | PCI | LEN | RSID | D1 | D2 | D3 | D4 |

First Response Frame of Multiple PDUs

| NAD | PCI | D1 | D2 | D3 | D4 | D5 | D6 |

Consecutive Response Frame of Multiple PDUs

FIG. 8

| Type of Command | Description | Command | Response |
|---|---|---|---|
| Read | Read Version Information | MRF<br>3C 10 05 23 12 00 10 10 FF<br><br>SRF<br>3D | 10 10 10 63 XX XX XX XX<br>10 21 XX XX XX XX XX XX<br>10 22 XX XX XX XX XX XX |
| Configure | Set OC levels using a multi frame write request to write to register 0x0068 | MRF<br>3C 10 10 07 3D 12 00 68 02<br>3C 10 21 07 02 FF FF FF FF<br><br>SRF<br>3D | |
| Control | Device Reset command by writing to register 0x0008 | MRF<br>3C 10 10 06 3D 12 00 08 02<br>3C 10 21 52 01 FF FF FF FF<br><br>SRF<br>3D | 10 05 7D 12 00 68 02 FF<br>No Response for a Reset Command |
| Status | Read the "00" Frame to get the status of the Slave LIN Device. | 00 | XX XX<br>The Response will indicate the status of device regarding any faults, events or communication errors. |

FIG. 9B

USB TYPE-C/PD PORT REAL TIME MONITORING AND CONTROL IN AN AUTOMOTIVE OR INDUSTRIAL ECOSYSTEM

CROSS REFERENCE TO RELATED APPLICATION

This application claims the benefit of U.S. Provisional Application No. 63/073,876, filed on Sep. 2, 2020, the disclosure of which is incorporated herein by reference in its entirety.

TECHNICAL FIELD

This disclosure generally relates to Universal Serial Bus (USB) systems, and more particularly, to methods and systems to configure, control, and monitor USB systems that are compliant with various revisions of the USB Power Delivery (USB-PD, also referred to as USB-C/PD) specification over standardized communication interface such as Local Interconnect Network (LIN), Controller Area Network (CAN), or others used in automotive, aviation, industrial or other ecosystems.

BACKGROUND

Various electronic devices (e.g., such as smartphones, tablets, notebook computers, laptop computers, hubs, chargers, adapters, etc.) are configured to communicate data or transfer power through USB connectors or ports according to USB power delivery protocols defined in various revisions of the USB Power Delivery (USB-PD) specification. For example, in some applications an electronic device may be configured as a power consumer to receive power through a USB connector (e.g., for battery charging), while in other applications an electronic device may be configured as a power provider to provide power to another device that is connected thereto through a USB connector. The USB-PD specification allows power providers and power consumers to dynamically negotiate the levels of the provided voltages and currents.

In automobiles, USB-PD ports may be placed at various locations in the interior cabin (e.g., display console, rear-seat entertainment subsystem, arm-rest) for occupants to charge electronic devices using power provided by the automobile electrical system. Components and sub-systems in automobiles typically communicate through a vehicle control and communication network based on standard serial communication protocols such as Local Interconnect Network (LIN), Controller Area Network (CAN), FLexRay, MOST, etc. For example, a controller of an automobile such as an electronic control unit (ECU) may configure, control, and monitor various vehicle functions using LIN-based communication. However, there is no existing solution that enables an ECU to directly monitor and control automotive USB-PD ports through the standard vehicle network. Some automotive USB-PD systems may use an external controller to enable the ECU to control the USB-PD ports through I2C or SPI-based interface. However, such non-standardized designs require a dedicated external controller to translate between the I2C or SPI protocol and the control registers of the USB-PD ports. The designs are difficult to integrate into standardized vehicle interfaces. They are also not scalable as it is not feasible or is costly to wire the I2C or SPI interface across the vehicle. As such, there is a need for direct control and monitoring of automotive USB-PD ports over standardized automotive interfaces that is efficient, cost-effective, and scalable.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 5 illustrates the service identifier (SID) indicating the type of service to be performed by a slave USB-C/PD system as requested by a LIN message received from a LIN master, in accordance with one aspect of the present disclosure;

FIG. 6 illustrates the protocol control information (PCI) indicating the packet data unit (PDU) format of data transmitted by a LIN master or a slave USB-C/PD system as requested by a LIN message, in accordance with one aspect of the present disclosure;

FIG. 7 illustrates the fields of the response portion of a LIN message for various PDU formats of master request frames transmitted by a LIN master to a slave USB-C/PD system, in accordance with one aspect of the present disclosure;

FIG. 8 illustrates the fields of the response portion of a LIN message for various PDU formats of data transmitted by a slave USB-C/PD system to a LIN master, in accordance with one aspect of the present disclosure;

FIG. 9B illustrates the frames of the read, configure, control, or status commands of the LIN messages issued by the LIN master to configure and monitor the slave USB-C/PD system of FIG. 9A and any response frames transmitted by the USB-C/PD system, in accordance with one aspect of the present disclosure;

DETAILED DESCRIPTION

Figure 1:
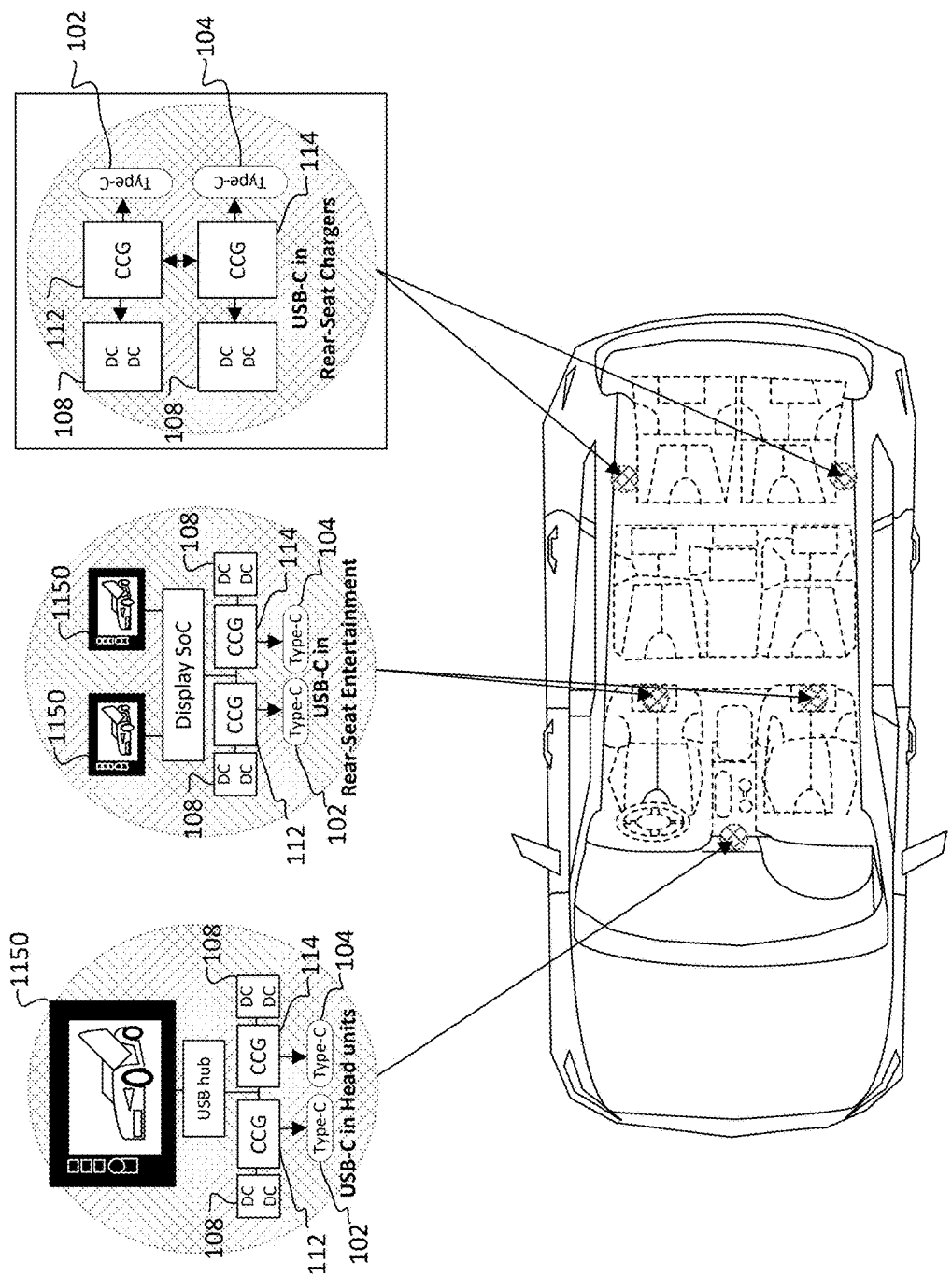
FIG. 1 is a diagram that illustrates multi-port USB-C/PD systems located at various locations in an automobile, in accordance with one aspect of the present disclosure.

Examples of various aspects and variations of the subject technology are described herein and illustrated in the accompanying drawings. The following description is not intended to limit the invention to these embodiments, but rather to enable a person skilled in the art to make and use this invention.

Described herein are various aspects of techniques for communicating with Universal Serial Bus Power Delivery (USB-PD) specifications, USB Type-C subsystem, or both (e.g., a USB Type-C subsystem that supports USB-PD functionality), collectively referred to as USB Type-C/PD or USB-C/PD systems over standard communication and control interfaces used in automotive, aviation, industrial, or other applications. In one aspect of the disclosure, solutions are provided to connect USB-C/PD systems to the Local Interconnect Network (LIN) used as a standardized automotive interface for serial communication. The solutions facilitate a network controller of the LIN bus such as a vehicle electronic control unit (ECU) to configure, control, and monitor charging and fault data of ports of the USB-C/PD systems. The ECU may manage power sharing, thermal sensing, display port and generic device status of the USB-C/PD systems over the existing vehicle network. For example, based on the battery power status and the system behavior, the ECU may control the power of the USB-C/PD ports, such as the ECU monitoring the charging information of the USB-C/PD ports to augment power sharing and power throttling capabilities. Charging status of the USB-C/PD connected devices and faults such as voltage shorts, port failures, etc., may be transmitted to the ECU through the LIN bus to display the charging information and warnings on the cockpit. Firmware updates of the USB-C/PD systems may happen over the ECU/OBD (on-board diagnostics) port or the ECU may dynamically configure the operations of the individual ports including powering down the ports. Advantageously, USB-C/PD systems may be easily integrated into existing communication networks, providing a cost-effective and scalable solution.

In one aspect of the disclosure, a method for a USB-C/PD device to operate as a slave device over the LIN bus to service commands transmitted by a master device such as the automotive ECU is disclosed. The method may include the USB-C/PD device listening for a frame on the LIN bus and dropping the frame if a complete frame is not received within a listen timeout period after the start of the frame. If a valid frame is detected, the USB-C/PD device may determine whether the frame is a publish or a subscribe frame based on a frame ID. If the frame is a publish frame (i.e., a slave response frame), the USB-C/PD device may transmit data stored in a frame buffer onto the LIN bus if a valid subscribe frame (i.e., a master request frame) was received prior to receiving the publish frame. The data stored in the frame buffer may be data read from a target address if the previous subscribe frame was a memory read request. Alternatively, the data stored in the frame buffer may be a write confirmation flag if the previous subscribed frame was a memory write request. If the frame is a subscribe frame, the USB-C/PD device may store the data received in the subscribe frame in the frame buffer. The USB-C/PD device may process the data in the frame buffer to determine the type of service to be performed based on the service ID. If the service ID indicates a diagnostic service frame for reading memory by address, the USB-C/PD device may read the data from the addressed memory into the frame buffer. If the service ID indicates a diagnostic service frame for writing memory by address, the USB-C/PD device may store the write data configured in the subscribe frame into the addressed memory. The USB-C/PD device may write a write confirmation flag into the frame buffer upon the successful completion of the write operation.

In one aspect of the disclosure, a method for a USB-C/PD device to operate as a slave device over a communication network to service commands transmitted by a master device of the communication network is disclosed. The communication network may include standard communication and control interfaces or buses used in automotive, aviation, industrial, or other applications. The method may include the USB-C/PD device receiving a message over the communication network from the master device. The USB-C/PD device may decode the received message to determine the type of commands. If the received message is a write command, the USB-C/PD device may decode a starting target address of one or more locations of the USB-C/PD device targeted by the write command and the control data to be stored into the locations starting from the starting target address. The USB-C/PD device may write the control data beginning from the starting target address into the one or more locations of the USB-C/PD device and upon the successful completion of the write command may store a write confirmation flag into a read response software register or location. The write confirmation flag may be read by the master device in a following read command to confirm that the USB-C/PD device has successfully executed the write command. If the received message is a get command, the USB-C/PD device may decode a starting target address of one or more locations of the USB-C/PD device targeted by the get command and the number of data bytes to be retrieved from the locations starting from the starting target address. The USB-C/PD device may retrieve the number of data bytes from the one or more locations of the USB-C/PD device beginning from the starting target address and may store the retrieved data into a serial interface FIFO such as a UART buffer FIFO. If the received message is a read command, the USB-C/PD device may drive onto the communication network a response message containing the data buffered in the read response software register or the serial interface FIFO for the master device. For example, when the read command follows a write command, the response message may contain the write confirmation flag stored in the read response software register. When the read command follows a get command, the response message may contain the data retrieved from the one or more locations and buffered in the serial interface FIFO as instructed by the get command.

In one aspect, the electronic devices connected to the ports of the USB-C/PD device may include, without limitation, personal computers (e.g., laptop computers, notebook computers, and so forth), mobile computing devices (e.g., tablets, tablet computers, e-reader devices, and so forth), mobile communication devices (e.g., smartphones, cell phones, personal digital assistants, messaging devices, pocket PCs, and so forth), connectivity and charging devices (e.g., hubs, docking stations, adapters, chargers, etc.), audio/video/data recording and/or playback devices (e.g., cameras, voice recorders, hand-held scanners, monitors, and so forth), and other similar electronic devices that can use USB ports (interfaces) for communication and/or battery charging.

As used herein, an electronic device or a system is referred to as "USB-enabled" or "USB-compliant" if the electronic device or system complies with at least one release of a USB specification. Examples of such USB specifications include, without limitation, the USB Specification Revision 2.0, the USB 3.0 Specification, the USB 3.1 Specification, and/or various supplements (e.g., such as On-The-Go, or OTG), versions and errata thereof. The USB specifications generally define the characteristics (e.g., attributes, protocol definition, types of transactions, bus management, programming interfaces, and so forth) of a differential serial bus that are required to design and build standard communication systems and peripherals.

For example, a USB-enabled peripheral electronic device attaches to a USB-enabled host device through a USB port of the host device to form a USB-enabled system. A USB 2.0 (or simply USB2) port may include a power line (e.g. $V_{Bus}$) of 5V, a differential pair of data lines (e.g., which may be denoted D+ or DP, and D− or DN), and a ground line (e.g., GND) for power return. A USB 3.0 port also provides the $V_{BUS}$, D+, D−, and GND lines for backward compatibility with USB 2.0. In addition, to support a faster differential bus (the USB SuperSpeed bus), a USB 3.0 port also provides a differential pair of transmitter data lines (denoted SSTX+ and SSTX−), a differential pair of receiver data lines (denoted SSRX+ and SSRX−), a power line for power (e.g., which may be denoted DPWR), and a ground line for power return (e.g., which may be denoted DGND). A USB 3.1 port provides the same lines as a USB 3.0 port for backward compatibility with USB 2.0 and USB 3.0 communications, but extends the performance of the SuperSpeed bus by a collection of features referred to as Enhanced SuperSpeed.

A more recent technology for USB connectors, called USB Type-C and defined in various releases of the USB Type-C specification, provides USB Type-C receptacle, plug, and cables that can support USB communications as well as power delivery over newer USB power delivery protocols defined, for example, in one or more revisions the USB-PD specifications. The USB-PD specification defines a standard protocol designed to enable the maximum functionality of USB-enabled devices by providing more flexible power delivery along with data communications over a single USB Type-C cable through USB Type-C ports. The USB-PD specification also describes the architecture, protocols, power supply behavior, parameters, and cabling necessary for managing power delivery over USB Type-C cables up to a maximum power. As used herein, a "USB Type-C/PD system" or a "USB-C/PD system" may refer to, for example, hardware circuitry that may be controllable by firmware and/or software in an integrated circuit (IC) controller, which is configured and operable to perform the functions and to satisfy the requirements specified in at least one release of the USB-PD specification.

FIG. 1 is a diagram that illustrates multi-port USB-C/PD systems located at various locations in an automobile, in accordance with one aspect of the present disclosure. A multi-port USB-C/PD system may include one master port 102 and one or more slave ports 104. The master port 102 may be controlled by a master controller 112. The slave ports 104 may be controlled by corresponding slave controllers 114. Power converters 108 convert an input voltage to a different voltage. In the depicted embodiment, power converters 108 are DC-DC power converters. In one embodiment, the multi-port USB-C/PD system is a multi-port USB-C/PD automotive rear-seat charger of an automobile. In another embodiment, the multi-port USB-C/PD system is part of a rear-seat entertainment system of an automobile. A rear-seat entertainment system may include a display system on chip (SoC) and one or more displays 1150 or other power consuming devices connected to the display SoC. In another embodiment, the multi-port USB-C/PD system is part of a head-unit of an automobile. The head-unit of the automobile may include a USB hub and one or more power consuming devices connected to the USB hub.

In other embodiments, the multi-port USB-C/PD system may be part of a multi-port USB-C charger in a vehicle, car, truck, van, boat, plane, building, house, factory, industrial facility, etc. In other embodiments, the multi-port USB-C/PD system may be a multi-port USB-C wall charger, a multi-port USB-C power bank, a multi-port USB-C power hub, a shared multi-port power adapter, etc. In other embodiments, the multi-port USB-C/PD system may use ports other than USB-C ports, such as wall outlets, Micro-USB ports, etc.

Figure 2:
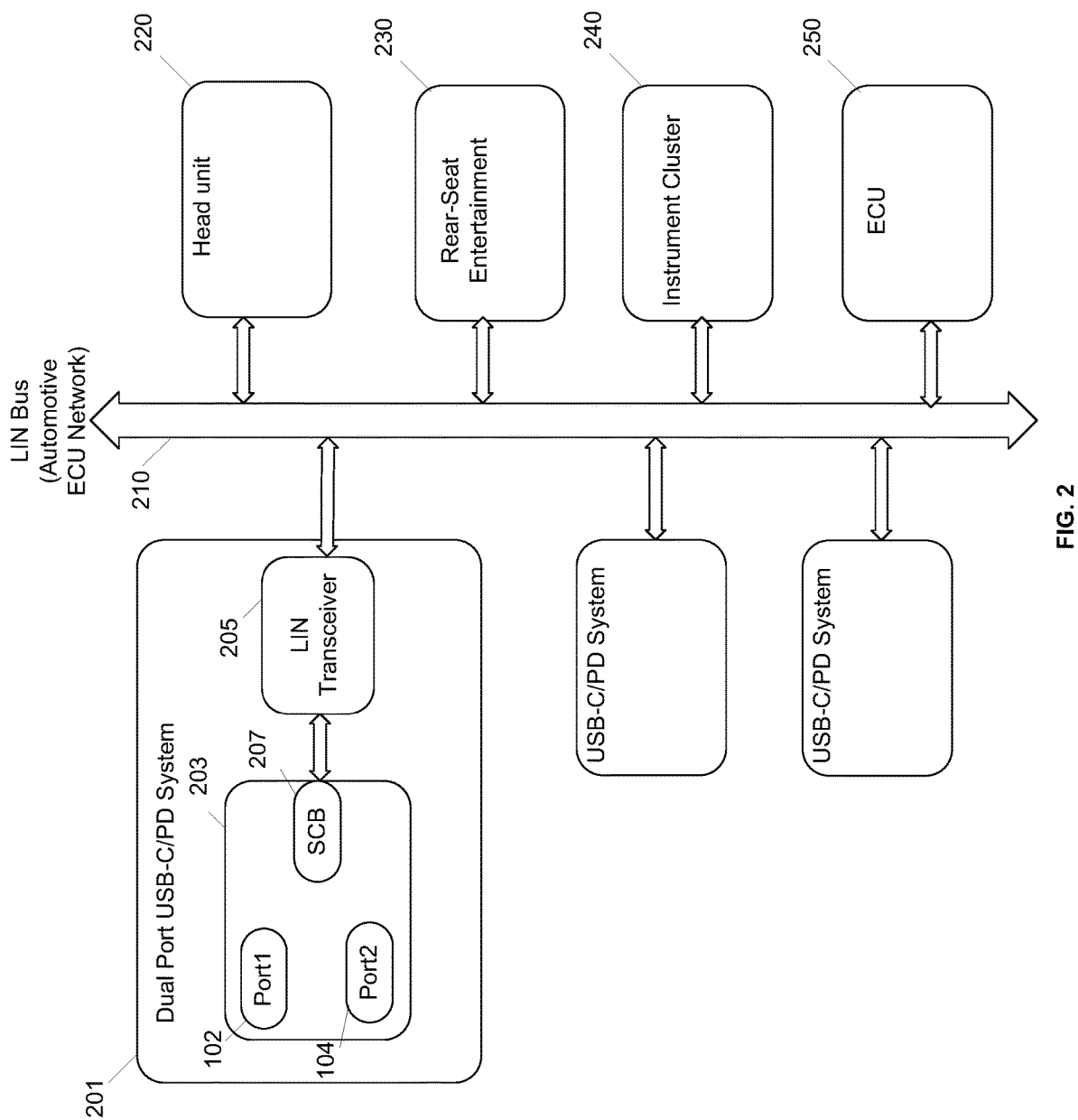
FIG. 2 is a block diagram that illustrates a solution for connecting the automotive USB-C/PD systems to an automotive LIN-based network, in accordance with one aspect of the present disclosure.

FIG. 2 is a block diagram that illustrates a solution for connecting the automotive USB-C/PD systems to an automotive LIN-based network, in accordance with one aspect of the present disclosure. LIN is a low-cost serial communication protocol primarily targeted for automotive networks. The disclosed solutions may also connect the USB-C/PD systems to other types of standard automotive networks including Controller Area Network (CAN), FLexRay, MOST, etc.

A dual-port USB-C/PD system 201 may include a USB-C/PD controller 203 and a LIN transceiver 205. The USB-C/PD controller 203 may act as a slave device to respond to LIN bus message frames transmitted by a master device such as an automotive ECU 250 or an automotive body control module (BCM). The automotive ECU 250 or BCM may configure, control, and monitor USB-C/PD ports such as port 1 (102) and port 2 (104) exposed by the dual-port USB-C/PD controller 203 to the LIN bus 210, also referred to as the ECU network. The USB-C/PD controller 203 may expose the USB-C/PD ports by repurposing a serial communication block (SCB) 207 to implement the serial communication interface. The SCB 207 may contain circuitry to implement baud-rate detection. The LIN transceiver 205 contains the peripheral circuitry to perform the voltage translation between the USB-C/PD controller 203 and the physical bus lines of the LIN bus 210 (e.g., voltage translation between UART TTL of the SCB 207 and the LIN bus 210). The LIN transceiver 205 may have various power modes such as a sleep mode when no activity is detected on the LIN bus for a minimum period of time. In other embodiments, the USB-C/PD controller 203 may contain the LIN peripheral circuitry to allow the dual-port USB-C/PD system 201 to directly communicate with the LIN bus without requiring the external LIN transceiver 205.

One or more USB-C/PD systems may be connected to the LIN bus to facilitate real time monitoring and control of the USB-C/PD ports. For example, a multi-port USB-C/PD system of a head-unit 220, an instrument cluster 240, or a rear-seat entertainment system 230, or a multi-port USB-C/PD automotive rear-seat charger shown in FIG. 1 may be connected to the LIN bus.

Figure 3:
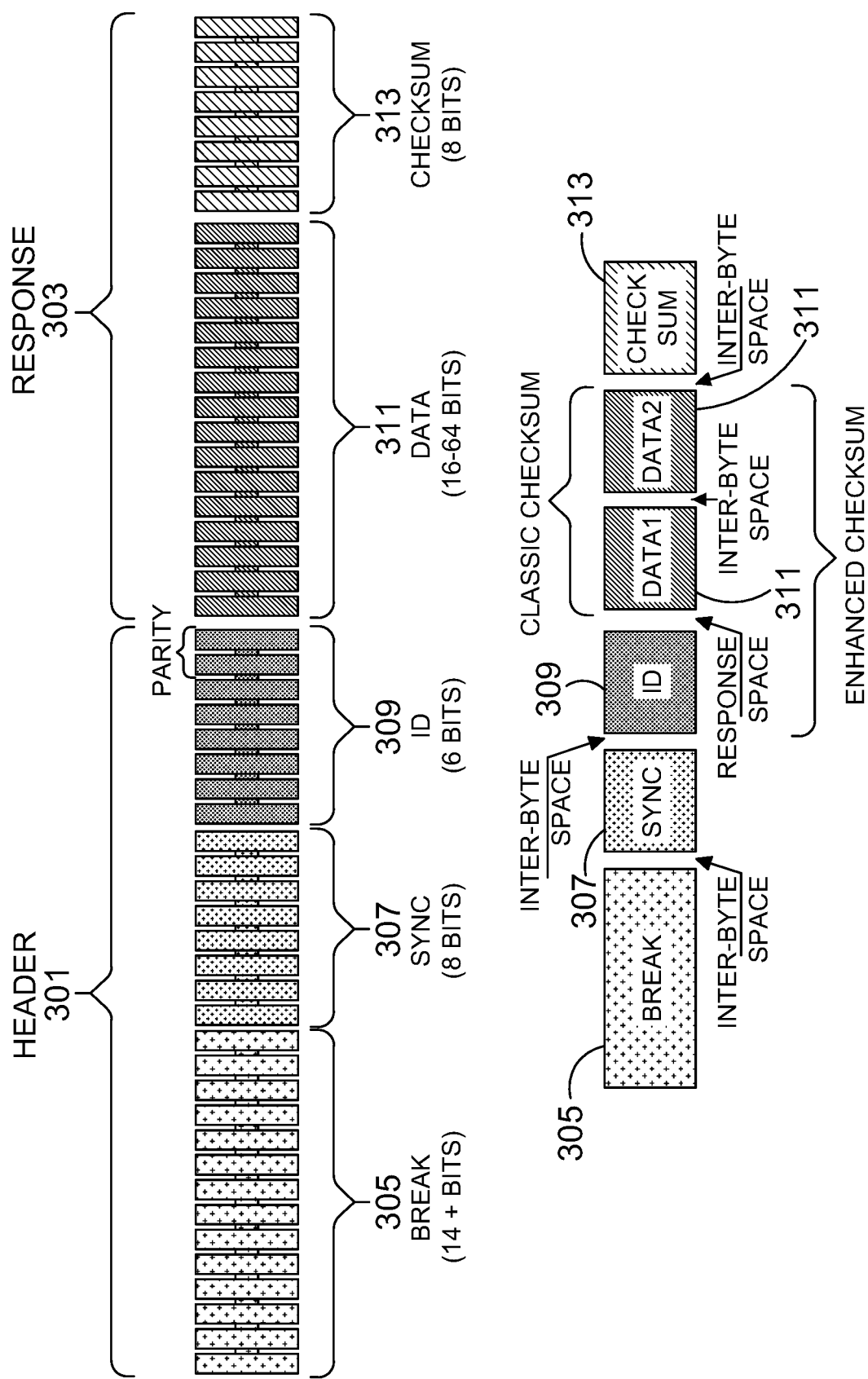
FIG. 3 illustrates a LIN bus message frame including a header portion transmitted by a LIN master to a slave USB-C/PD system over the LIN bus, and a response portion that may be transmitted by either the LIN master or the slave USB-C/PD system depending on the type of message frame, in accordance with one aspect of the present disclosure.

FIG. 3 illustrates a LIN bus message frame including a header portion 301 transmitted by a LIN master to a slave USB-C/PD system over the LIN bus, and a response portion 303 that may be transmitted by either the LIN master or the slave USB-C/PD system depending on the type of message frame, in accordance with one aspect of the present disclosure.

The header 301 may include the break field 305, the sync field 307, and the frame identifier field 309. The break field 305 is a minimum 14 bits long (and in practice most often 20 bits). The break field acts as a "start of frame" notice to all LIN nodes on the bus. The sync field 307 is 8 bits long and has a predefined value of 0x55. The structure allows the slave nodes to determine the time between rising and falling edges and thus the baud rate used by the master node. The slave nodes may use the determined baud rate to stay in sync with the master node. The node identifier field 309 is 6 bits followed by 2 parity bits. The frame identifier field 309 identifies the type of LIN message frame transmitted. Slave nodes may determine the validity of the frame identifier field 309 based on the parity bits. When there is a valid LIN message frame, a slave node may ignore the subsequent data transmission, listen to the data transmission, or publish data in response to the header 301.

Figure 4:
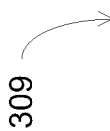
FIG. 4 illustrates the frame identifier indicating the type of message frames of a LIN message received by a slave USB-C/PD system from a LIN master, in accordance with one aspect of the present disclosure.

FIG. 4 illustrates the frame identifier 309 indicating the type of message frames of a LIN message received by a slave USB-C/PD system from a LIN master, in accordance with one aspect of the present disclosure. The slave USB-C/PD system may detect the frame identifier 309 to determine how to respond to the message frame. If the message frame is a subscribe frame (i.e., master request frame or MRF), also referred to as a listen frame, and the message frame is addressed to the slave USB-C/PD system, the USB-C/PD system responds by receiving the data in the response portion of the message frame. The received data may further indicate in a service identifier field if the subscribe frame is a memory read request commanding the USB-C/PD system to read data from a target address or a memory write request commanding the USB-C/PD system to write data into a target address.

If message frame is a publish frame and the message frame is addressed to the slave USB-C/PD system, the USB-C/PD system responds by transmitting onto the LIN bus the requested data in the response portion of the message frame. For example, if the message frame is a publish frame for error status from the USB-C/PD system, the USB-C/PD system responds by transmitting error bit and fault sticky bits in the response portion of the message frame. If the message frame is a publish frame for read data from the USB-C/PD system (i.e., slave response frame or SRF), the USB-C/PD system responds by transmitting data read from a location addressed by the memory read request of a previous subscribe frame. In one embodiment, if the message frame is a slave response frame from the USB-C/PD system and the previous subscribe frame was a memory write request commanding the USB-C/PD system to write data into a target address, the USB-C/PD system may respond to the slave response frame by transmitting a confirmation flag of the memory write request.

Referring back to FIG. 3, the response portion 303 of the message frame may contain up to 8 bytes of data 311 and one byte of checksum 313. When the message frame is a subscribe frame, the data 311 may include a node address field (NAD) identifying the address of the slave USB-C/PD system, a protocol control information field (PCI) identifying the packet data unit (PDU) format of transmitted data, a service identifier field (SID) identifying the request to be performed by the slave USB-C/PD system, a length field (LEN) identifying the length of a multi-frame PDU, and the field of transmitted data from the master node. When the message frame is a publish frame, the data 311 may include the NAD, PCI, and the LEN for a multi-frame PDU as in the subscribe frame, a response service identifier field (RSID) identifying the content of the response, and the field of transmitted data from the slave USB-C/PD system.

The checksum 313 is used to check the integrity of the message frame. In one embodiment, the classic checksum is based on the inverted eight-bit sum of all 8 bytes of data 311. In one embodiment, the enhanced checksum also includes the frame identifier field 309. In one embodiment, inter-byte space may be added between the fields of the header portion 301 and between the data 311 and the checksum 313 of the response portion 303. In one embodiment, a response space may be added between the header portion 301 and the response portion 303 to allow the USB-C/PD system sufficient time to respond to the header portion 301 from the master.

FIG. 5 illustrates the service identifier (SID) indicating the type of service to be performed by a slave USB-C/PD system as requested by a LIN message received from a LIN master, in accordance with one aspect of the present disclosure. SID of 0 to 0xAF and 0xB8 to 0xFE may be used for diagnostic frames while 0xB0 to 0xB7 may be used for configuration. The SID may be contained in a subscribe frame.

The diagnostic frame as indicated by the SID may include a unified diagnostic service (UDS) read memory by address request (SID of 0x23) commanding the USB-C/PD system to read data from a target address. The USB-C/PD system may decode from the field of transmitted data in the response portion 303 of the subscribe frame a starting target address of one or more locations of the USB-C/PD system targeted by the read request and the number of data bytes to be read from the locations starting from the starting target address. The USB-C/PD system may read the requested data from the one or more locations into a frame buffer. The USB-C/PD system may transmit the read data in the frame buffer onto the LIN bus when a publish frame is received following the subscribe frame containing the UDS read memory by address request.

The diagnostic frame as indicated by the SID may indicate a UDS write memory by address request (SID of 0x3D) commanding the USB-C/PD system to write data into a target address. The USB-C/PD system may decode from the field of transmitted data in the response portion 303 of the message frame a starting target address of one or more locations of the USB-C/PD device targeted by the write request, the number of bytes to be written, and the data to be written. The USB-C/PD system may write the data into the one or more locations beginning from the starting target address and upon the successful completion of the write command may store a write confirmation flag into the frame buffer. The USB-C/PD system may transmit the write confirmation flag onto the LIN bus when a publish frame is received following the subscribe frame containing the UDS write memory by address request.

FIG. 6 illustrates the protocol control information (PCI) indicating the packet data unit (PDU) format of data transmitted by a LIN master or a slave USB-C/PD system as requested by a LIN message, in accordance with one aspect of the present disclosure.

The 4 MSB of the PCI byte indicates the PDU format and the 4 LSB of the PCI byte indicates additional information depending on the PDU format. A single frame (SF) for the PDU format (4 MSB of PCI is 0000b) indicates that the transported message fits into a single PDU, i.e., it contains at maximum five data bytes after excluding the NAD byte, PCI byte, and the SID or RSID byte. Thus, a subscribe or publish frame containing a maximum of five bytes of data may use a single frame PDU. For a SF, the 4 LSB of the PCI byte indicates the length field and is set to the number of data bytes plus one (for the SID or RSID).

Transmission of frame messages with more than six bytes (including the SID or RSID) is performed via segmentation and transmission of multiple PDUs. A segmented transmission starts with a first frame PDU (FF) and continues with multiple consecutive frame PDUs (CF). For a FF (4 MSB of PCI is 0001b), the 4 LSB of the PCI bytes indicates the 4 MSB of the 12-bit length field (length/256) to support the transfer of up to 4096 data bytes. The remaining 8 LSB of the 12-bit length field is placed in a separate byte of the message frame. For a CF (4 MSB of PCI is 0010b), the 4 LSB of the PCI byte indicates the frame counter. The first CF of the message starts from a frame counter of 1. Each subsequent CF increments the frame counter until it reaches 15 and then wraps around to 0 to repeat the count.

FIG. 7 illustrates the fields of the response portion 303 of a LIN message for various PDU formats of master request frames transmitted by a LIN master to a slave USB-C/PD system, in accordance with one aspect of the present disclosure.

The single request frame includes a NAD byte, a PCI byte, a SID byte, and up to 5 bytes of data in the single PDU. If the SID byte indicates a node configuration frame, the PDU may contain the address of the configuration register of the USB-C/PD system and the configuration data. If the SID byte indicates a UDS write memory by address diagnostic frame, the PDU may contain the address of the memory of the USB-C/PD system, the number of bytes to be written into the address of the memory, and the data to be written. If the SID byte indicates a UDS read memory by address diagnostic frame, the PDU may contain the address of the memory of the USB-C/PD system and the number of bytes to be read from the address of the memory. Any unused bytes in the PDU may be filled with 0xFF.

The first request frame of multiple PDUs includes a NAD byte, a PCI byte, a length byte containing the 8 LSB of the 12-bit length, a SID byte, and the first 4 bytes of data in the multiple PDUs. If the SID byte indicates a UDS write memory by address diagnostic frame, the first 4 bytes of data in the multiple PDUs may contain the starting address of the memory of the USB-C/PD system, the number of bytes to be written starting from the starting address, and the first data byte to be written. If the SID byte indicates a UDS read memory by address diagnostic frame, the PDU may contain the starting address of the memory of the USB-C/PD system and the number of bytes to be read starting from the starting address.

The consecutive request frame of multiple PDUs includes a NAD byte, a PCI byte, and 6 bytes of data in the multiple PDUs. If the SID byte indicates a UDS write memory by address diagnostic frame, the 6 bytes of data in the multiple PDUs may contain some of the data to be written.

FIG. 8 illustrates the fields of the response portion 303 of a LIN message for various PDU formats of slave response frames transmitted by a slave USB-C/PD system to a LIN master, in accordance with one aspect of the present disclosure. The fields for the various PDU formats for the slave response frames are the same as those for the master request frames except for the response service identifier (RSID). The RSID byte specifies the content of the response frame and is generated from the SID byte of the preceding master request frame requesting the read data (e.g., UDS read memory by address diagnostic frame) by adding the SID byte and 0x40. The data in the various PDU formats contain the data read from the register or the one or more memory address requested by the preceding master request frame.

Figure 9A:
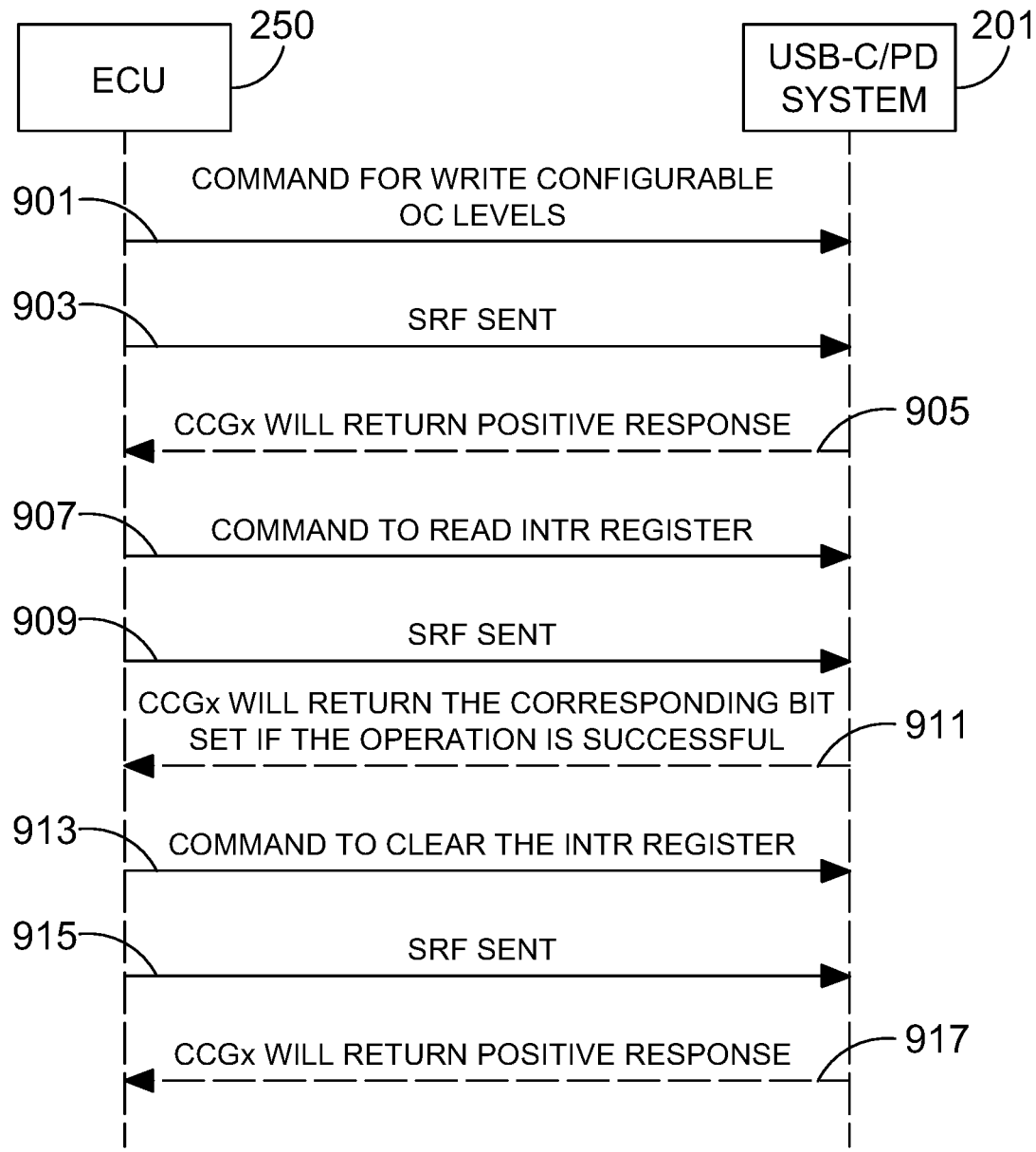
FIG. 9A illustrates a first example flow of LIN messages for a LIN master to configure and monitor a slave USB-C/PD system over a LIN-based ECU network, in accordance with one aspect of the present disclosure.

FIG. 9A illustrates a first example flow of LIN messages for a LIN master to configure and monitor a slave USB-C/PD system over a LIN-based ECU network, in accordance with one aspect of the present disclosure. In one example, a LIN master such as an automotive ECU 250 may transmit in 901 a master request frame containing the UDS write memory by address service request to configure the operating condition (OC) of a port of the USB-C/PD system 201. In one aspect, the LIN master may configure the OC of a port of the USB-C/PD system by configuring various operating threshold levels as an absolute value or as a percentage of the port power delivery profile (PDP). In one aspect, the detection of the OC of the port reaching a configured threshold level may trigger a port shutdown.

FIG. 9B illustrates the frames of the read, configure, control, or status commands of the LIN messages issued by the LIN master to configure and monitor the slave USB-C/PD system of FIG. 9A and any response frames transmitted by the USB-C/PD system, in accordance with one aspect of the present disclosure. For example, to configure the OC register 0x0068 of the port of the USB-C/PD system 201 using configure command 951, the ECU 250 may send a master request frame (MRF) in two PDUs by setting the frame ID in both PDUs to 0x3C (subscribe frame). The first PDU may set the PCI byte to 0x10 (FF), the length field to 0x07, SID to 0x3D (UDS write memory by address), and may include the address 0x0068 of the OC register of the USB-C/PD system 201, and the number of bytes (0x02) of write data. The second PDU may set the PCI byte to 0x21 (CF) and may include the two bytes of OC level (0x0702) to be written into the OC register. Referring back to FIG. 9A, the ECU 250 may then transmit in 903 a slave response frame (frame ID set to 0x3D) to trigger the USB-C/PD system 201 to respond with a confirmation of the successful configuration of the OC level. The USB-C/PD system 201 may confirm by transmitting in 905 a positive response in the response portion of the slave response frame (SRF). As shown in FIG. 9B, the positive response of the SRF in configure command 951 may be an echo of some fields (e.g., RSID of 0x7D generated by adding the SID of 0x3D and 0x40, address 0x0068 of the OC register of the USB-C/PD system 201, the number of bytes (0x02) of write data) of the first PDU of the master request frame. If USB-C/PD system 201 was not able to configure the OC level, it may transmit a negative response containing an error code in the response portion of the slave response frame.

In another example, the ECU 250 may control the USB-C/PD system 201 by transmitting a master request frame containing the UDS write memory by address service request to command a device reset of the USB-C/PD system 201 by writing to register 0x0008 using control command 952. The ECU 250 may send the MRF in two PDUs by setting the frame ID in both PDUs to 0x3C (subscribe frame). The first PDU may set the PCI byte to 0x10 (FF), the length field to 0x06, SID to 0x3D (UDS write memory by address), and may include the address 0x0008 of the register to reset the USB-C/PD system 201, and the number of bytes (0x02) of write data. The second PDU may set the PCI byte to 0x21 (CF) and may include the two bytes of write data (0x5201) for the device reset command. The device reset command may not be followed by a slave response frame.

Referring back to FIG. 9A, in another example, the ECU 250 may transmit in 907 a master request frame containing the UDS read memory address service request to read a register of the USB-C/PD system 201 such as an interrupt register. For example, as shown in read command 953 in FIG. 9B, the ECU 250 may send a master request frame (MRF) to read the firmware version information of the USB-C/PD system 201 by setting the frame ID to 0x3C (subscribe frame), PCI to 0x05 (SF and 5 bytes for the length field), SID to 0x23 (UDS read memory by address), and may include the address 0x0010 of the register containing the version information and the number of bytes (0x10) to be read from the register. Referring back to FIG. 9A, the ECU 250 may then transmit in 909 a slave response frame to trigger the USB-C/PD 201 system to respond with the read data. The USB-C/PD system 201 may transmit in 911 the data read from the register requested by the MRF in the response portion of the slave response frame. As shown in FIG. 9B, the SRF in read command 953 may be transmitted in three PDUs. The first PDU may set the PCI byte to 0x10 (FF), the length field to 0x10, the RSID to 0x63 (generated by adding the SID of 0x23 and 0x40), and may include the first four bytes of the read data. The second PDU may set the PCI byte to 0x21 (first CF) and may include the next 6 bytes of the red data. The third PDU may set the PCI byte to 0x22 (second CF) and may include the last 6 bytes of the red data. If the USB-C/PD system 201 was not able to read the interrupt register, it may transmit a negative response containing an error code in the response portion of the slave response frame. In another example, the ECU 250 may issue a status monitoring command 954 to the USB-C/PD system 201 by sending a frame with the frame ID set to 0x00 to read the status of the USB-C/PD system 201. The USB-C/PD system may transmit a response to indicate its status including any faults, events or communication errors. In one embodiment, the ECU 250 may have a mechanism to generate alerts based on the received status information by displaying on the head unit 220 or the instrument cluster 240 real time fault or warning indications.

Figure 10:
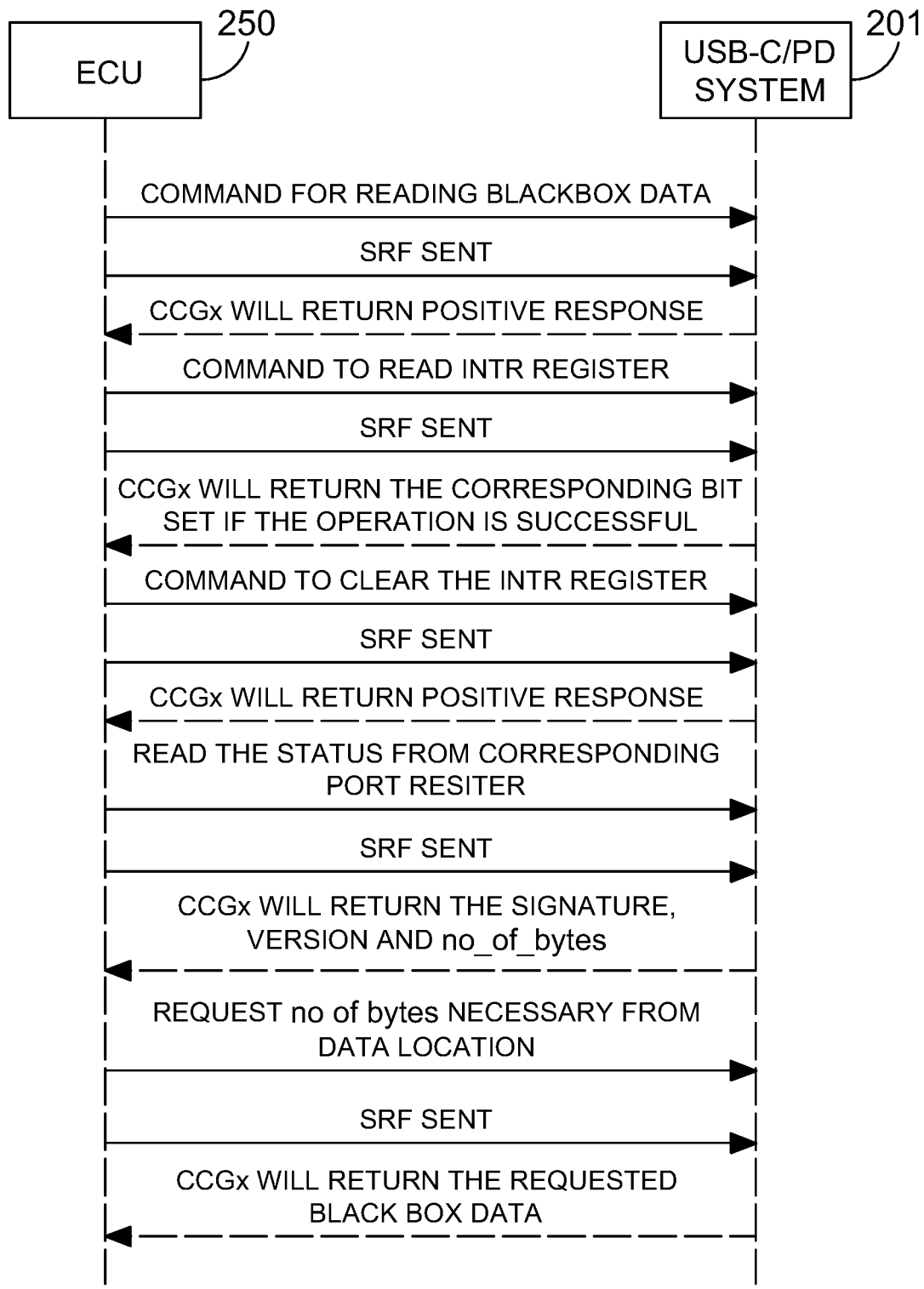
FIG. 10 illustrates a second example flow of LIN messages for a LIN master to configure and monitor a slave USB-C/PD system over a LIN-based ECU network, in accordance with one aspect of the present disclosure.

Referring back to FIG. 9A, in another example, the ECU 250 may transmit in 913 a master request frame containing the configuration update service request to clear the interrupt register of the USB-C/PD system 201. The ECU 250 may then transmit in 915 a slave response frame to trigger the USB-C/PD system 201 to respond with a confirmation of the successful clearing of the interrupt register. The USB-C/PD 201 system may confirm by transmitting in 917 a positive response in the response portion of the slave response frame or may transmit a negative response containing an error code if the interrupt register was not cleared. In one embodiment, the ECU 250 may update or download the firmware of the USB-C/PD system 201 over the LIN-based network or other types of standardized communication interfaces. For example, the ECU 250 may update or download the firmware of the USB-C/PD system using the configuration update service requests, UDS write memory by address service requests, or combinations thereof FIG. 10 illustrates a second example flow of LIN messages for a LIN master to configure and monitor a slave USB-C/PD system over a LIN-based ECU network, in accordance with one aspect of the present disclosure.

In one example, the ECU 250 may transmit a master request frame containing the UDS read memory address service request to read one or more registers or memory locations (black-box data) of the USB-C/PD system 201. The response portion of the master request frame may contain the starting address of the registers or the memory locations and the number of data bytes to be read starting from the starting address. The ECU 250 may then transmit a slave response frame to trigger the USB-C/PD system 201 to respond with the black-box data. The USB-D/PD 201 system may transmit the requested bytes of black-box data in the response portion of the slave response frame.

Figure 11:
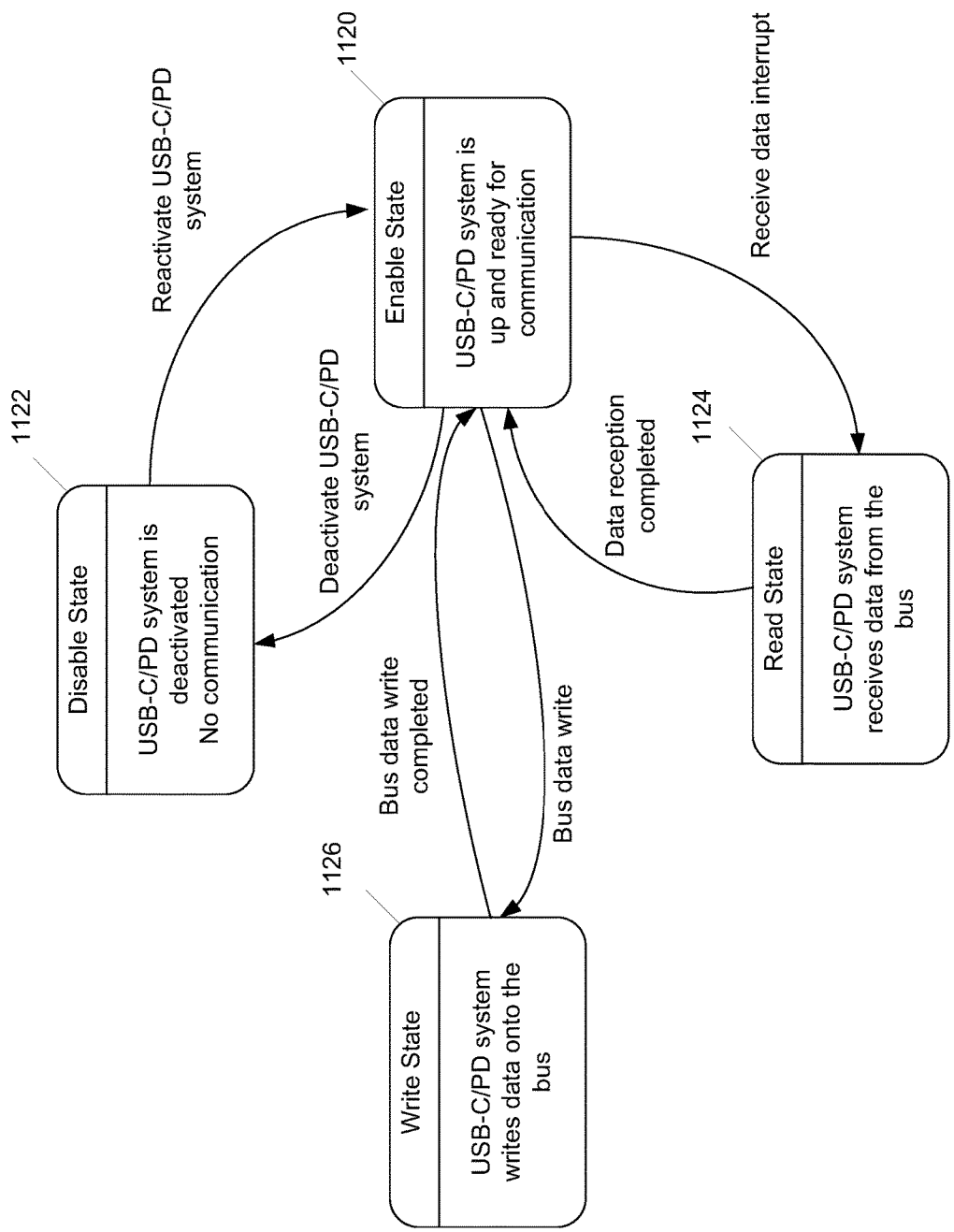
FIG. 11 illustrates a flow diagram of a slave USB-C/PD system transitioning between various states in the LIN-based network, in accordance with one aspect of the present disclosure.

FIG. 11 illustrates a flow diagram of a slave USB-C/PD system transitioning between various states in the LIN-based network, in accordance with one aspect of the present disclosure. The USB-C/PD system may initially be in the enable state 1120 listening for a message frame on the LIN bus. A LIN master such as an automotive ECU may transmit a master request frame with the first data field (NAD byte) set to 0 and the rest of the response portion 303 set to 0xFF to indicate a diagnostic sleep command. Upon receiving the diagnostic sleep command, the USB-C/PD system may transition to the disabled state 1122. In the disabled state 1122, the USB-C/PD system enters the low power mode by deactivating the function of the USB-C/PD system including communication with the LIN bus. The USB-C/PD system may wake up from the low power mode when it detects a dominant activity on the LIN bus. Upon waking up, the USB-C/PD system may transition back to the enable state 1120 by performing a software reset. In one embodiment, the transceiver of the USB-C/PD system such as the LIN transceiver 205 may enter into a sleep mode when no activity is detected on the LIN bus for an extended period of time as determined by a bus-inactivity timer. The transceiver may wake up from the sleep mode when it detects a dominant activity on the LIN bus.

When the USB-C/PD system receives a master request frame in the enabled state 1120, it may receive a receive data interrupt. The USB-C/PD system may transition to the read state 1124 to receive the data contained in the response portion of the master request frame from the bus. Upon the completion of the data reception, the USB-C/PD system may transition back to the enabled state 1120. In one embodiment, the USB-C/PD system may process the service requested by the master request frame such as configuration update, UDS read memory by address, UDS write memory by address, etc., in the read state 1124.

When the USB-C/PD system receives a slave response frame in the enabled state 1120, it may enter the write state 1126 to write data onto the bus during the response portion of the slave response frame. In one embodiment, the USB-C/PD system may transmit a positive or negative response as a response to a preceding master request frame containing a configuration update or a UDS write memory by address service request. In one embodiment, the USB-C/PD system may transmit the requested read data from one or more registers or memory locations addressed by a UDS read memory by address service request of a preceding master request frame. Upon the completion of the data write operation, the USB-C/PD system may transition back to the enable state 1120.

Figure 12:
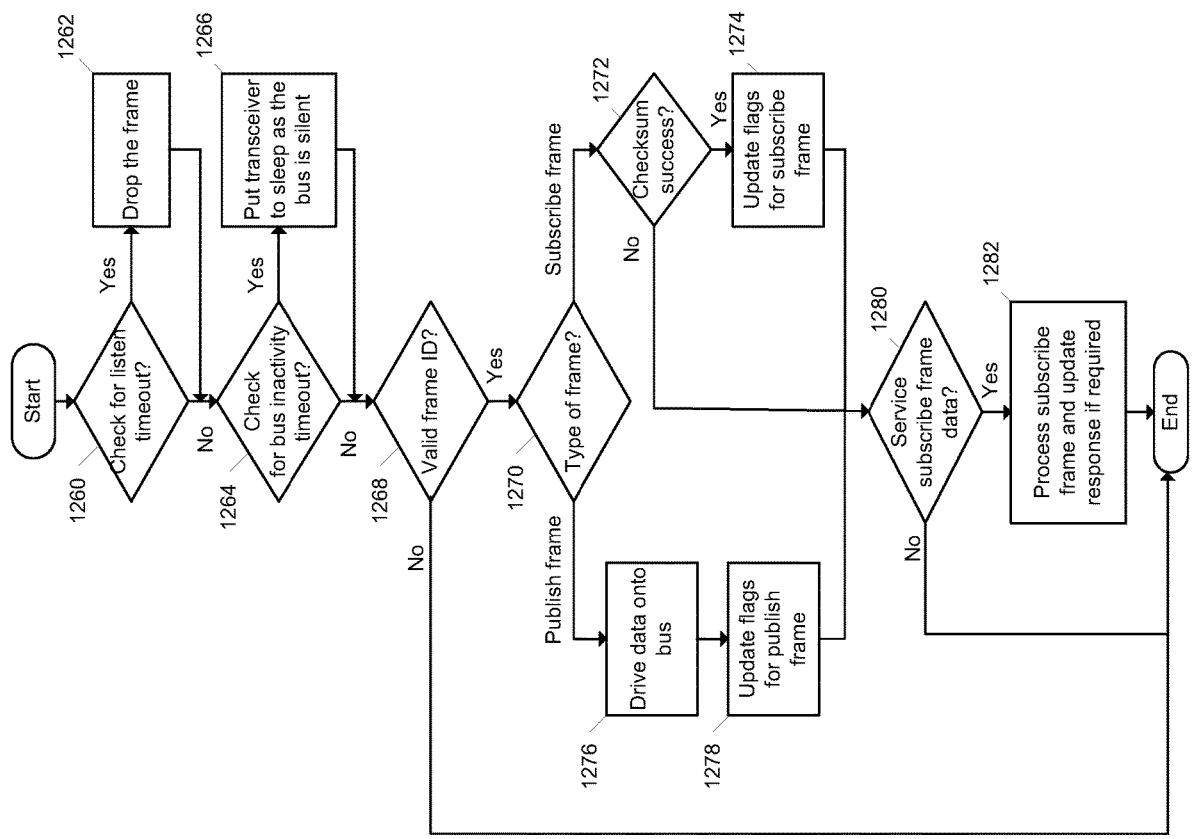
FIG. 12 illustrates a flow diagram of a method for a slave USB-C/PD system to process LIN messages to perform various types of services as commanded by a LIN master, in accordance with one aspect of the present disclosure.

FIG. 12 illustrates a flow diagram of a method for a slave USB-C/PD system to process LIN messages to perform various types of services as commanded by a LIN master, in accordance with one aspect of the present disclosure. The method may be performed by processing logic that may include hardware (e.g., circuitry, dedicated logic, programmable logic, a processor, a processing device, a central processing unit (CPU), a multi-core processor, a system-on-chip (SoC), etc.), software (e.g., instructions running/executing on a processing device), firmware (e.g., microcode), or a combination thereof In some embodiments, the method may be performed by the USB-C/PD controller 203 of FIG. 2.

At operation 1260, the USB-C/PD system detects the start of a frame on the LIN bus and determines if a complete frame is not received within a listen timeout period after the start of the frame. If the listen timeout period for complete frame reception expires before a complete frame is received, the USB-C/PD system drops the frame at operation 1262. In one embodiment, the listen timeout period for complete frame reception is set at 20 ms.

At operation 1264, if a complete frame is received within the listen timeout period for complete frame reception, the USB-C/PD system checks for an extended period of bus inactivity by determining if the LIN bus is silent for longer than a bus inactive timeout period. If true, the USB-C/PD system puts the transceiver to the sleep mode to save power at operation 1266. Otherwise, the USB-C/PD system proceeds to operation 1268. In one embodiment, the transceiver may wake up from the sleep mode when it detects a dominant activity on the LIN bus.

At operation 1268, the USB-C/PD system determines if the received frame has a frame ID supported by the USB-C/PD system and if the frame is addressed to the USB-C/PD system. If the received frame is not a supported frame or is not addressed to the USB-C/PD system, the USB-C/PD system does not respond to the frame. Otherwise, at operation 1270, the USB-C/PD system determines if the frame is a subscribe frame (i.e., master request frame) or a publish frame (i.e., slave response frame).

If the frame is a subscribe frame, the USB-C/PD system checks the integrity of the frame by determining if the checksum of the response portion of the subscribe frame passes at operation 1272. If true, at operation 1274, the USB-C/PD system updates the flag for the corresponding frame and signals. In one embodiment, the USB-C/PD system may store the data received in the subscribe frame in a frame buffer and may update a flag for the USB-C/PD system to service the request contained in the subscribe frame.

At operation 1280, the USB-C/PD system checks to determine if the frame buffer contains data from a subscribe frame for servicing. In one embodiment, the USB-C/PD system may check the flag set by operation 1274. If the frame buffer contains data from a subscribe frame for servicing such as a diagnostic service frame, the USB-C/PD system processes the diagnostic service frame and updates the response at operation 1282. In one embodiment, the USB-C/PD system may process the data in the frame buffer to determine the type of service to be performed based on the service ID. If the service ID indicates a diagnostic service frame for reading memory by address, the USB-C/PD system may read the data from the addressed memory into the frame buffer. If the service ID indicates a diagnostic service frame for writing memory by address, the USB-C/PD system may store the write data specified in the subscribe frame into the addressed memory. The USB-C/PD system may write a write confirmation flag into the frame buffer upon the successful completion of the write operation.

If the frame is a publish frame and the publish frame was preceded by a valid subscribe frame, the USB-C/PD system pushes the data stored in the frame buffer onto the LIN bus at operation 1276. In one embodiment, the data may be transferred from the frame buffer into a Tx FIFO for driving onto the LIN bus. The data stored in the frame buffer may be data read from a target address if the previous subscribe frame was a diagnostic service frame for reading memory by address. Alternatively, the data stored in the frame buffer may be a write confirmation flag contained in a positive response if the previous subscribe frame was a diagnostic service frame for writing memory by address. In one embodiment, if the previous subscribe frame was not successfully serviced, the USB-C/PD system may transmit a negative response containing an error code. In one embodiment, if the publish frame is to publish error status from the USB-C/PD system, the USB-C/PD system may respond by transmitting error bit and fault sticky bits. The read data, positive response, negative response, or error status are driven onto the LIN bus during the response portion of the publish frame.

At operation 1278, the USB-C/PD system updates the flag for the corresponding frame and signals. In one embodiment, the USB-C/PD system may update a flag to indicate that the data in the frame buffer has been transmitted onto the LIN bus and that the publish frame has been successfully services.

Figure 13:
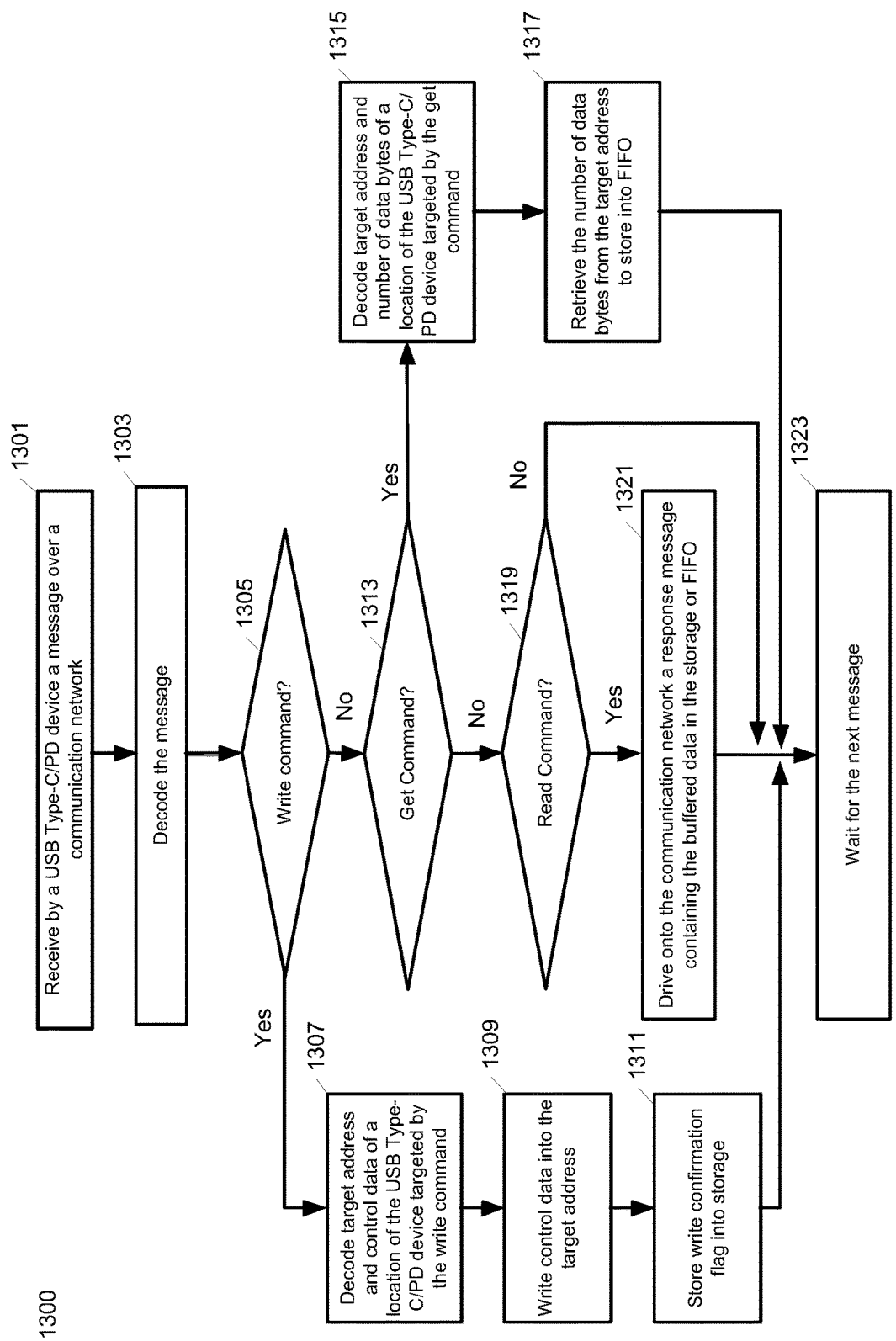
FIG. 13 illustrates a flow diagram of a method for a slave USB-C/PD system to process commands received over a standard interface from a master device to perform various types of services, in accordance with one aspect of the present disclosure.

FIG. 13 illustrates a flow diagram of a method 1300 for a slave USB-C/PD system to process commands received over a standard interface from a master device to perform various types of services, in accordance with one aspect of the present disclosure. Method 1300 may be performed by processing logic that may include hardware (e.g., circuitry, dedicated logic, programmable logic, a processor, a processing device, a central processing unit (CPU), a multi-core processor, a system-on-chip (SoC), etc.), software (e.g., instructions running/executing on a processing device), firmware (e.g., microcode), or a combination thereof In some embodiments, the method 1300 may be performed by the USB-C/PD controller 203 of FIG. 2. The communication network may include standard communication and control interfaces or buses used in automotive, aviation, industrial, or other applications.

At operation 1301, the USB-C/PD system receives a message frame over the communication network from the master device.

At operation 1303, the USB-C/PD system decodes the message frame to determine the type of commands.

At operation 1305, if the message frame is determined to be a write command, the USB-C/PD system decodes a starting target address of one or more locations of the USB-C/PD system targeted by the write command and the control data to be stored into the locations starting from the starting target address at operation 1307.

At operation 1309, the USB-C/PD system writes the control data into the one or more locations of the USB-C/PD system beginning from the starting target address.

At operation 1311, the USB-C/PD system stores a write confirmation flag into storage such as a read response location. The USB-C/PD system then waits for the next message frame at operation 1323.

At operation 1313, if the message frame is determined to be a get command, the USB-C/PD system decodes a starting target address of one or more locations of the USB-C/PD system targeted by the get command and the number of data bytes to be retrieved from the locations starting from the starting target address at operation 1315.

At operation 1317, the USB-C/PD system retrieves the number of data bytes from the one or more locations of the USB-C/PD system beginning from the starting target address and stores the retrieved data into a FIFO. The USB-C/PD system then waits for the next message frame at operation 1323.

At operation 1319, if the message frame is determined to be a read command, the USB-C/PD system drives onto the communication network a response message containing the data buffered in the storage or the FIFO for the master device at operation 1321. In one embodiment, when the read command follows a write command, the response message may contain the write confirmation flag retrieved from the storage. When the read command follows a get command, the response message may contain the data retrieved from the one or more locations and buffered in the FIFO as instructed by the get command. The USB-C/PD system then waits for the next message frame at operation 1323.

Figure 14:
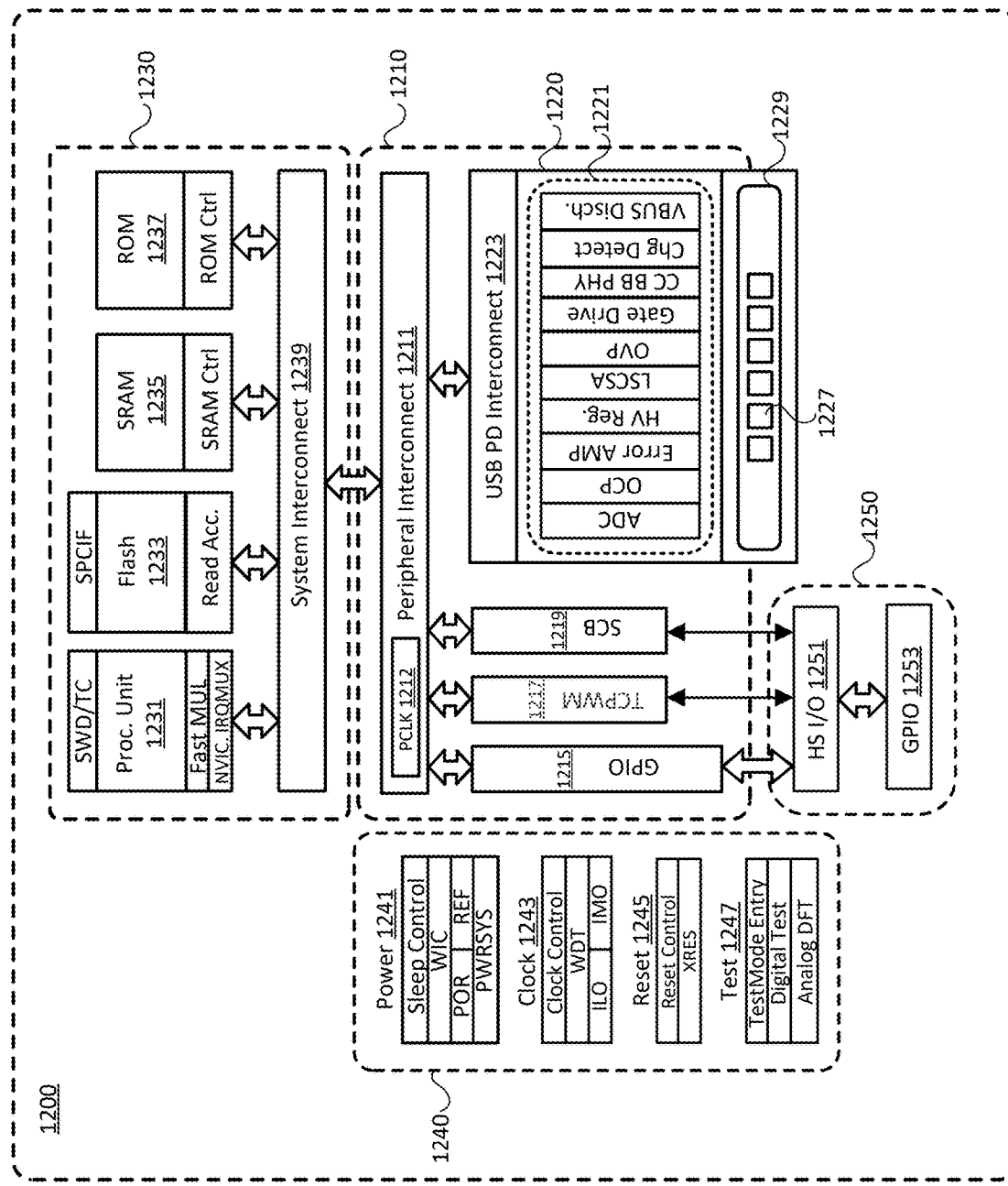
FIG. 14 illustrates a block diagram of a USB-C/PD system that may be configured, controlled, and monitored by a master controller over a standard communication network used in automotive, aviation, industrial, or other applications, in accordance with one aspect of the present disclosure.

FIG. 14 illustrates a block diagram of a USB-C/PD system 1200 that may be configured, controlled, and monitored by a master controller over a standard communication network used in automotive, aviation, industrial, or other applications, in accordance with one aspect of the present disclosure. System 1200 may include a peripheral subsystem 1210 including a number of components for use in USB Power Delivery (USB-PD). Peripheral subsystem 1210 may include a peripheral interconnect 1211 including a clocking module, peripheral clock (PCLK) 1212 for providing clock signals to the various components of peripheral subsystem 1210. Peripheral interconnect 1211 may be a peripheral bus, such as a single-level or multi-level advanced high-performance bus (AHB), and may provide a data and control interface between peripheral subsystem 1210, CPU subsystem 1230, and system resources 1240. Peripheral interconnect 1211 may include controller circuits, such as direct memory access (DMA) controllers, which may be programmed to transfer data between peripheral blocks without input by, control of, or burden on CPU subsystem 1230.

The peripheral interconnect 1211 may be used to couple components of peripheral subsystem 1210 to other components of system 1200. Coupled to peripheral interconnect 1211 may be a number of general purpose input/outputs (GPIOs) 1215 for sending and receiving signals. GPIOs 1215 may include circuits configured to implement various functions such as pull-up, pull-down, input threshold select, input and output buffer enabling/disable, single multiplexing, etc. Still other functions may be implemented by GPIOs 1215. One or more timer/counter/pulse-width modulator (TCPWM) 1217 may also be coupled to the peripheral interconnect and include circuitry for implementing timing circuits (timers), counters, pulse-width modulators (PWMs) decoders, and other digital functions that may operate on I/O signals and provide digital signals to system components of system 1200. Peripheral subsystem 1210 may also include one or more serial communication blocks (SCBs) 1219 for implementation of serial communication interfaces such as I2C, serial peripheral interface (SPI), universal asynchronous receiver/transmitter (UART), controller area network (CAN), clock extension peripheral interface (CXPI), etc.

For USB power delivery applications, peripheral subsystem 1210 may include a USB power delivery subsystem 1220 coupled to the peripheral interconnect and comprising a set of USB-PD modules 1221 for use in USB power delivery. USB-PD modules 1221 may be coupled to the peripheral interconnect 1211 through a USB-PD interconnect 1223. USB-PD modules 1221 may include an analog-to-digital conversion (ADC) module for converting various analog signals to digital signals; an error amplifier (AMP) regulating the output voltage on VBUS line per a PD contract; a high-voltage (HV) regulator for converting the power source voltage to a precise voltage (such as 3.5-5V) to power system 1200; a low-side current sense amplifier (LSCSA) for measuring load current accurately, an over voltage protection (OVP) module and an over-current protection (OCP) module for providing over-current and over-voltage protection on the VBUS line with configurable thresholds and response times; one or more gate drivers for external power field effect transistors (FETs) used in USB power delivery in provider and consumer configurations; and a communication channel PHY (CC BB PHY) module for supporting communications on a Type-C communication channel (CC) line. USB-PD modules 1221 may also include a charger detection module for determining that a charging circuit is present and coupled to system 1200 and a VBUS discharge module for controlling discharge of voltage on VBUS. The discharge control module may be configured to couple to a power source node on the VBUS line or to an output (power sink) node on the VBUS line and to discharge the voltage on the VBUS line to the desired voltage level (i.e., the voltage level negotiated in the PD contract). USB power delivery subsystem 1220 may also include pads 1227 for external connections and electrostatic discharge (ESD) protection circuitry 1229, which may be required on a Type-C port. USB-PD modules 1221 may also include a bi-directional communication module for supporting bi-directional communications with another controller, such as between a primary-side controller and a secondary-side controller of a flyback converter.

GPIO 1215, TCPWM 1217, and SCB 1219 may be coupled to an input/output (I/O) subsystem 1250, which may include a high-speed (HS) I/O matrix 1251 coupled to a number of GPIOs 1253. GPIOs 1215, TCPWM 1217, and SCB 1219 may be coupled to GPIOs 1253 through HS I/O matrix 1251.

System 1200 may also include a central processing unit (CPU) subsystem 1230 for processing commands, storing program information, and data. CPU subsystem 1230 may include one or more processing units 1231 for executing instructions and reading from and writing to memory locations from a number of memories. Processing unit 1231 may be a processor suitable for operation in an integrated circuit (IC) or a system-on-chip (SOC) device. In some embodiments, processing unit 1231 may be optimized for low-power operation with extensive clock gating. In this embodiment, various internal control circuits may be implemented for processing unit operation in various power states. For example, processing unit 1231 may include a wake-up interrupt controller (WIC) configured to wake the processing unit up from a sleep state, allowing power to be switched off when the IC or SOC is in a sleep state. CPU subsystem 1230 may include one or more memories, including a flash memory 1233, and static random access memory (SRAM) 1235, and a read-only memory (ROM) 1237. Flash memory 1233 may be a non-volatile memory (NAND flash, NOR flash, etc.) configured for storing data, programs, and/or other firmware instructions. Flash memory 1233 may include a read accelerator and may improve access times by integration within CPU subsystem 1230. SRAM 1235 may be a volatile memory configured for storing data and firmware instructions accessible by processing unit 1231. ROM 1237 may be configured to store boot-up routines, configuration parameters, and other firmware parameters and settings that do not change during operation of system 1200. SRAM 1235 and ROM 1237 may have associated control circuits. Processing unit 1231 and the memories may be coupled to a system interconnect 1239 to route signals to and from the various components of CPU subsystem 1230 to other blocks or modules of system 1200. System interconnect 1239 may be implemented as a system bus such as a single-level or multi-level AHB. System interconnect 1239 may be configured as an interface to couple the various components of CPU subsystem 1230 to each other. System interconnect 1239 may be coupled to peripheral interconnect 1211 to provide signal paths between the components of CPU subsystem 1230 and peripheral subsystem 1210.

System 1200 may also include a number of system resources 1240, including a power module 1241, a clock module 1243, a reset module 1245, and a test module 1247. Power module 1241 may include a sleep control module, a wake-up interrupt control (WIC) module, a power-on-reset (POR) module, a number of voltage references (REF), and a PWRSYS module. In some embodiments, power module 1241 may include circuits that allow system 1200 to draw and/or provide power from/to external sources at different voltage and/or current levels and to support controller operation in different power states, such as active, low-power, or sleep. In various embodiments, more power states may be implemented as system 1200 throttles back operation to achieve a desired power consumption or output. Clock module 1243 may include a clock control module, a watch-dog timer (WDT), an internal low-speed oscillator (ILO), and an internal main oscillator (IMO). Reset module 1245 may include a reset control module and an external reset (XRES) module. Test module 1247 may include a module to control and enter a test mode as well as testing control modules for analog and digital functions (digital test and analog DFT).

System 1200 may be implemented in a monolithic (e.g., single) semiconductor die. In other embodiments, various portions or modules of system 1200 may in implemented on different semiconductor dies. For example, memory modules of CPU subsystem 1230 may be on-chip or separate. In still other embodiments, separate-die circuits may be packaged into a single multi-chip module, or remain separate and disposed on a circuit board (or in a USB cable connector) as separate elements.

System 1200 may be implemented in a number of application contexts to provide USB-PD functionality thereto. In each application context, an IC controller or SOC implementing system 1200 may be disposed and configured in an electronic device (e.g., a USB-enabled device) to perform operations in accordance with the techniques described herein. In one example embodiment, system 1200 may be disposed and configured in an automotive, aviation, industrial or other ecosystem using LIN, CAN, or other types of standardized interface used for serial communication (e.g., the USB-C/PD controller 203 used with the LIN bus 210 of FIG. 2). In another example embodiment, system 1200 may be disposed and configured in a personal computer (PC) power adapter for a laptop, a notebook computer, etc. In another example embodiment, system 1200 may be disposed and configured in a power adapter (e.g., a wall charger) for a mobile electronic device (e.g., a smartphone, a tablet, etc.). In another example embodiment, system 1200 may be disposed and configured in a wall socket that is configured to provide power over USB Type-A and/or Type-C port(s). In another example embodiment, system 1200 may be disposed and configured in a car charger that is configured to provide power over USB Type-A and/or Type-C port(s). In yet another example embodiment, system 1200 may be disposed and configured in a power bank that can get charged and then provide power to another electronic device over a USB Type-A or Type-C port. In other embodiments, a system like system 1200 may be configured with the power switch gate control circuitry described herein and may be disposed in various other USB-enabled electronic or electromechanical devices.

Various embodiments of the techniques for communicating with USB-C/PD systems over standard communication and control interfaces may include various operations. These operations may be performed and/or controlled by hardware components, digital hardware and/or firmware/programmable registers (e.g., as implemented in computer-readable medium), and/or combinations thereof. The methods and illustrative examples described herein are not inherently related to any particular computer or other apparatus. Various systems (e.g., such as USB hubs and docking stations) may be used in accordance with the teachings described herein, or it may prove convenient to construct more specialized apparatus to perform the required method steps. The required structure for a variety of these systems will appear as set forth in the description above.

A computer-readable medium used to implement operations of various aspects of the disclosure may be non-transitory computer-readable storage medium that may include, but is not limited to, electromagnetic storage medium, magneto-optical storage medium, read-only memory (ROM), random-access memory (RAM), erasable programmable memory (e.g., EPROM and EEPROM), flash memory, or another now-known or later-developed non-transitory type of medium that is suitable for storing configuration information.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "may include", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing. For example, certain operations may be performed, at least in part, in a reverse order, concurrently and/or in parallel with other operations.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component.

Additionally, "configured to" or "configurable to" can include generic structure (e.g., generic circuitry) that is manipulated by firmware (e.g., an FPGA) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A system comprising:
a Universal Synchronous Bus Type-C Power Delivery (USB-C/PD) port; and
a USB-C/PD processing subsystem operatively coupled to the USB-C/PD port and configured to:
receive directly a non-USB-based message frame transmitted by a master device over a non-USB communication network through a transceiver and a repurposed serial communication block of the USB-C/PD processing subsystem, wherein the transceiver performs voltage translations between the USB-C/PD processing subsystem and the non-USB communication network, and wherein the USB-C/PD processing subsystem decodes directly the message frame to determine a frame type to control how the USB/PD port operates in response to the message frame;
decode directly the message frame to determine the frame type, the frame type indicating one of a request frame from the master device to control power sharing operations of the USB-C/PD port and a response frame to monitor the power sharing operations of the USB-C/PD port;
in response to the message frame being determined to be the request frame, receive control data from the master device over the communication network to control the power sharing operations of the USB-C/PD port; and
in response to the message frame being determined to be the response frame, transmit response data that monitors the power sharing operations of the USB-C/PD port to the master device over the communication network.

2. The system of claim 1, wherein the request frame comprises:
a write request frame to write configuration data into one or more memory write locations of the system to control the power sharing operations of the USB-C/PD port, wherein the control data in the write request frame includes the configuration data; or
a read request frame to read the response data from one or more memory read locations of the system.

3. The system of claim 2, wherein the processing subsystem is further configured to:
detect that the request frame comprises the write request frame;
write the control data into the one or more memory write locations of the system; and
set a write confirmation flag to indicate that the one or more memory write locations are written with the control data.

4. The system of claim 3, wherein the processing subsystem is further configured to:
receive a second message frame transmitted by the master device over the communication network;
decode the second message frame to determine that the second message frame comprises the response frame; and
transmit the write confirmation flag as the response data to the master device over the communication network.

5. The system of claim 2, wherein the processing subsystem is further configured to:
detect that the request frame comprises the read request frame; and
read memory data from the one or more memory read locations of the system to store into a buffer.

6. The system of claim 5, wherein the processing subsystem is further configured to:
receive a second message frame transmitted by the master device over the communication network;
decode the second message frame to determine that the second message frame comprises the response frame; and
transmit the memory data stored in the buffer as the response data to the master device over the communication network.

7. The system of claim 2, wherein the processing subsystem is further configured to:
determine that the write request frame or the read request frame fails to be serviced by the system;
receive a second message frame transmitted by the master device over the communication network;
decode the second message frame to determine that the second message frame comprises the response frame; and
transmit an error message as the response data to the master device over the communication network to indicate that the write request frame or the read request frame fails to be serviced by the system.

8. The system of claim 1, wherein the control data is received from the master device over the communication network in a plurality of the request frames.

9. The system of claim 1, wherein the response data is transmitted to the master device over the communication network in a plurality of the response frames.

10. The system of claim 1, wherein the communication network comprises one of an automotive Local Interconnect Network (LIN) and an automotive Controller Area Network (CAN).

11. A method, comprising:
receiving directly, by a Universal Synchronous Bus Type-C Power Delivery (USB-C/PD) controller operatively coupled to a USB-C/PD port, a non-USB-based message frame transmitted by a master device over a non-USB communication network through a transceiver and a repurposed serial communication block of the USB-C/PD controller, wherein the transceiver performs voltage translations between the USB-C/PD controller and the non-USB communication network, and wherein the USB-C/PD controller decodes directly the message frame to determine a frame type to control how the USB/PD port operates in response to the message frame;
decoding directly, by the USB-C/PD controller, the message frame to determine the frame type, the frame type indicating one of a request frame from the master device to control power sharing operations of the USB-C/PD port and a response frame to monitor the power sharing operations of the USB-C/PD port;
in response to determining the message frame to be the request frame, receiving by the USB-C/PD controller control data from the master device over the communication network to control the power sharing operations of the USB-C/PD port; and
in response to determining the message frame to be the response frame, transmitting by the USB-C/PD controller response data that monitors the power sharing operations of the USB-C/PD port to the master device over the communication network.

12. The method of claim 11, wherein the request frame comprises:
a write request frame to write configuration data into one or more memory write locations of the USB-C/PD port to control the power sharing operations of the USB-C/PD port, wherein the control data in the write request frame includes the configuration data; or
a read request frame to read the response data from one or more memory read locations of the USB-C/PD port.

13. The method of claim 12, further comprising:
detecting by the USB-C/PD controller that the request frame comprises the write request frame;
writing, by the USB-C/PD controller, the control data into the one or more memory write locations of the USB-C/PD port; and
setting, by the USB-C/PD controller, a write confirmation flag to indicate that the one or more memory write locations are written with the control data.

14. The method of claim 13, further comprising:
receiving, by the USB-C/PD controller, a second message frame transmitted by the master device over the communication network;
decoding, by the USB-C/PD controller, the second message frame to determine that the second message frame comprises the response frame; and
transmitting, by the USB-C/PD controller, the write confirmation flag as the response data to the master device over the communication network.

15. The method of claim 12, further comprising:
detecting by the USB-C/PD controller that the request frame comprises the read request frame; and
reading, by the USB-C/PD controller, memory data from the one or more memory read locations of the USB-C/PD port to store into a buffer.

16. The method of claim 15, further comprising:
receiving, by the USB-C/PD controller, a second message frame transmitted by the master device over the communication network;
decoding, by the USB-C/PD controller, the second message frame to determine that the second message frame comprises the response frame; and
transmitting, by the USB-C/PD controller, the memory data stored in the buffer as the response data to the master device over the communication network.

17. The method of claim 12, further comprising:
determining by the USB-C/PD controller that the write request frame or the read request frame fails to be serviced by the USB-C/PD port;
receiving, by the USB-C/PD controller, a second message frame transmitted by the master device over the communication network;
decoding, by the USB-C/PD controller, the second message frame to determine that the second message frame comprises the response frame; and
transmitting, by the USB-C/PD controller, an error message as the response data to the master device over the communication network to indicate that the write request frame or the read request frame fails to be serviced by the USB-C/PD port.

18. The method of claim 11, wherein the control data is received from the master device in a plurality of the request frames or the response data is transmitted to the master device in a plurality of the response frames over the communication network.

19. The method of claim 11, wherein the communication network comprises one of an automotive Local Interconnect Network (LIN) and an automotive Controller Area Network (CAN).

20. A method, comprising:
receiving directly, by a Universal Synchronous Bus Type-C Power Delivery (USB-C/PD) controller operatively coupled to a USB-C/PD port, a command transmitted by a master device over a non-USB communication network using a non-USB-based protocol through a transceiver and a repurposed serial communication block of the USB-C/PD controller, wherein the transceiver performs voltage translations between the USB-C/PD controller and the non-USB communication network, and wherein the USB-C/PD controller decodes directly the command to determine a command type to control how the USB/PD port operates in response to the command;
decoding directly, by the USB-C/PD controller, the command to determine one of a control command used by the master device to control power sharing operations of the USB-C/PD port or a monitor command used by the master device to monitor the power sharing operations of the USB-C/PD port, the control command and the monitor command being different types of the command type; and
configuring, by the USB-C/PD controller, the power sharing operations of the USB-C/PD port in response to the control command; and transmitting, by the USB-C/PD controller to the master device over the communication network, operational information of the power sharing operations of the USB-C/PD port in response to the monitor command.

\* \* \* \* \*